United States Patent [19]

Troha

[11] Patent Number: 4,766,690
[45] Date of Patent: Aug. 30, 1988

[54] FISHING ROD MARKING BUOY

[76] Inventor: Louis J. Troha, 23501 Geneva, Oak Park, Mich. 48237

[21] Appl. No.: 15,668

[22] Filed: Feb. 17, 1987

[51] Int. Cl.⁴ ..................... A01K 97/00; A01K 87/00
[52] U.S. Cl. ........................................ 43/25; 43/18.1; 441/8
[58] Field of Search ............................. 43/25, 18.1, 23

[56] References Cited

U.S. PATENT DOCUMENTS

| | | | |
|---|---|---|---|
| 1,719,838 | 7/1929 | Haselton | 441/8 |
| 2,418,549 | 4/1947 | De Rugeris | 441/8 |
| 3,056,978 | 10/1962 | Bradley | 441/8 |
| 3,624,849 | 12/1971 | Brannaker | 441/8 |
| 4,126,907 | 11/1978 | Fish | 43/25 |
| 4,290,159 | 9/1981 | McLennan | 441/8 |
| 4,583,314 | 4/1986 | Kirkland | 43/25 |

FOREIGN PATENT DOCUMENTS 552898  2/1958  Canada .................... 43/25

Primary Examiner—Crosby Gene P.
Attorney, Agent, or Firm—Charles W. Chandler

[57] ABSTRACT

A marking buoy includes a housing mounted on an article such as a fishing rod, a buoy wedged in the housing by a water-soluble material to prevent removal of the buoy through the open end of the housing until the buoy has been immersed in the water for a predetermined period of time.

4 Claims, 1 Drawing Sheet

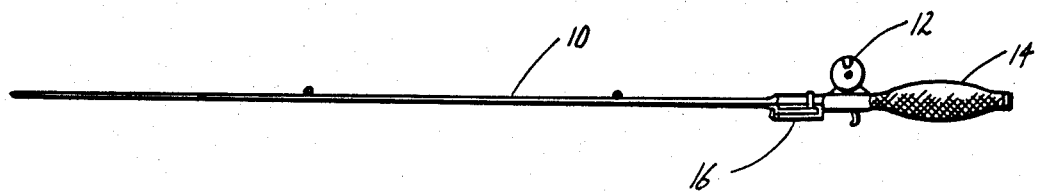
fig. 1
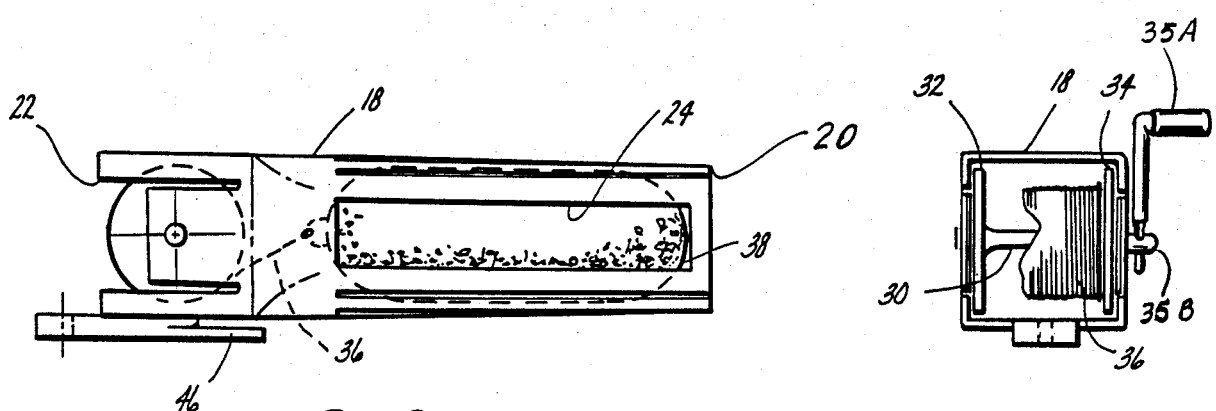
fig. 2
fig. 4
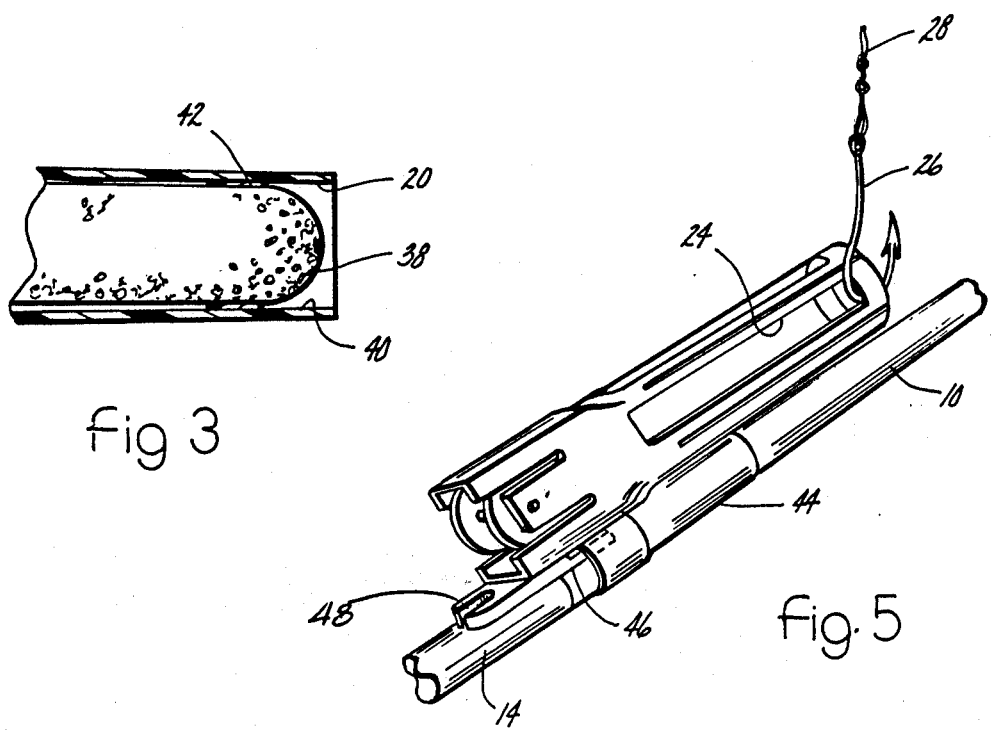
fig 3
fig. 5

FISHING ROD MARKING BUOY

BACKGROUND OF THE INVENTION

This invention is related to a buoy attached to an object, such as a fishing rod, which can be accidently dropped in the water.

Flotation devices are commonly used for locating and retrieving objects that accidently are dropped in the water. Examples of such prior art devices are disclosed in U.S. Pat. No. 4,583,314 which issued Apr. 22, 1986 to Donald R. Kirkland; U.S. Pat. No. 4,126,907 which issued Nov. 28, 1978 to Donald C. Fish; U.S. Pat. No. 2,892,198 which issued to I. J. Gruenberg, June 30, 1959; and U.S. Pat. No. 2,528,799 which issued Nov. 7, 1950 to J. G. Strong.

Typically, such devices include a buoy, usually connected by a cord to the fishing rod. When the fishing rod is dropped in the water, the buoy is released to locate the fishing rod. The cord provides means for retrieving the fishing rod from the water. Usually such devices are relatively complicated and expensive.

SUMMARY OF THE INVENTION

The broad purpose of the present invention is to provide an improved buoy retrieving or marking device which may be mounted on either a fishing rod or boat gear subjected to sudden motions as the rod is being used in its routine fishing tasks, without releasing the buoy. The buoy is enclosed in a housing strapped to the fishing rod. The housing has an elongated slot which permits both the housing and the fishing rod to be raised from the water by a hook and line.

The buoy is connected by a long cord to a reel that is unwound as the buoy is released from the housing. The housing has a internal, tapered configuration which terminates in an opening for passing the buoy. The buoy is lightly wedged in the housing with a water-soluble paper. Thus the buoy cannot be accidently released from the housing by the fisherman engaging in his fishing activities. However, if the object attached to the buoy housing is accidently dropped in the water, the water-soluble material dissolves, thereby releasing the buoy.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a view illustrating a marking buoy mounted on a fishing rod to illustrate the preferred embodiment of the invention;

FIG. 2 is an enlarged elevational view of the buoy housing;

FIG. 3 is a fragmentary sectional view of the buoy housing;

FIG. 4 is a fragmentary end view of the housing of FIG. 2;

FIG. 5 is a view showing the manner in which the marking buoy is mounted on a fishing rod, and showing the manner in which a hook may be employed for retrieving a sunken fishing rod and marking buoy.

DESCRIPTION OF THE PREFERRED EMBODIMENT

Referring to the drawing, FIG. 1 illustrates a conventional fishing rod 10 having a reel 12 mounted on elongated handle 14. Marking buoy means 16 is mounted on the fishing rod for retrieving the fishing rod when it is accidently dropped in the water. Marking buoy means 16 includes an elongated housing 18, illustrated in FIGS. 2 and 3, having openings 20 and 22.

The housing has an elongated slot 24, as illustrated in FIG. 5, so that hook 26 connected to retrieving line 28, can be employed for grasping both the fishing rod and the housing to retrieve them from the water.

Reel 30, having its ends rotatably mounted on opposite sides of housing 18, has a pair of reel sides 32 and 34 disposed in the housing. Cord 36 is wound on reel 30 and has one end attached to the center of the reel. Handle 35A is removably mounted on the end 35B of the reel for rotating the reel to wind-up cord 36.

An elongated buoy 38, preferably formed of a brightly colored material, is mounted in the housing and attached to the cord. The arrangement is such that when the buoy is removed from the housing, the cord is unwound from the reel to form a connection between the buoy and the housing.

Referring to FIG. 3, housing 18 is internally tapered at 40 toward opening 20. Water-soluble material 42 lightly wedges the buoy in the tapered wall of the housing so that it is relatively unmovable and cannot accidently pass through opening 20 by a sudden casting motion of the rod as the fisherman engages in catching fish.

If the fishing rod is accidently dropped in the water, water-soluble material 42, after a predetermined period of time, is dissolved by the water, thereby permitting the buoy to pass through opening 20 so that it rises to the surface of the water where its color attracts the attention of the fisherman. The user can then retrieve the fishing rod by raising the cord together with the fishing rod to the surface of the water.

The marking buoy may be mounted on other objects such as an engine, a tackle box or used by divers for underwater markers.

The outer end of lip 46 has an open-ended slot 48 for using a threaded fastener, not shown, to fasten the housing to an object where underwater location is to be marked.

Referring to FIG. 5, strap means 44 provide means for wrapping lip 46 on the housing to the fishing rod.

Having described my invention, I claim.

1. A marking buoy for attachment to an article, such as a fishing rod, which may accidentally be dropped into the water, comprising:

a housing having a first opening;

reel means rotatably mounted in the housing;

a cord connected to the reel means so as to be unwound therefrom as the reel means is rotated;

floatable buoy means disposed in the housing and connected to the cord such that as the buoy is moved away from the reel means, the cord is unwound therefrom;

water soluble material in the housing wedging the buoy means to prevent the buoy from passing through the first opening unless the buoy is immersed in water for a predetermined time, and to permit a sudden motion of the housing without ejecting the buoy through said first opening;

means for attaching the housing to the article which may be dropped in the water; and the housing having a second opening for engaging a hook used to retrieve both the housing and the article from the water.

2. A combination as defined in claim 1, in which the attachment means includes the housing having a slot, and a strap for passing through the slot and around a portion of the article for connecting the housing thereto.

3. A combination as defined in claim 1, in which the housing means includes an internal chamber having a wall tapered toward said first opening.

4. A combination as defined in claim 1, including handle means connected to the reel means for rotating same.

* * * * *